US007286706B2

United States Patent
Blaimberger et al.

(10) Patent No.: US 7,286,706 B2
(45) Date of Patent: Oct. 23, 2007

(54) DEVICE FOR DETECTING AND REPRESENTING MOVEMENTS

(75) Inventors: Frank Blaimberger, Bobingen (DE); Alexander Jarczyk, Freising (DE); Matthias Schneider-Hufschmidt, München (DE)

(73) Assignee: Siemens Aktiengesellschaft, Munich (DE)

( * ) Notice: Subject to any disclaimer, the term of this patent is extended or adjusted under 35 U.S.C. 154(b) by 736 days.

(21) Appl. No.: 10/492,621

(22) PCT Filed: Oct. 2, 2002

(86) PCT No.: PCT/EP02/11095

§ 371 (c)(1),
(2), (4) Date: Apr. 12, 2004

(87) PCT Pub. No.: WO03/034323

PCT Pub. Date: Apr. 24, 2003

(65) Prior Publication Data

US 2004/0247160 A1     Dec. 9, 2004

(30) Foreign Application Priority Data

Oct. 12, 2001   (DE)   ................................. 01124524

(51) Int. Cl.
*G06K 9/00*   (2006.01)
*G06K 9/22*   (2006.01)
*G06F 3/033*   (2006.01)

(52) U.S. Cl. ...................... 382/188; 382/314; 345/162; 345/179

(58) Field of Classification Search ................ 382/107, 382/187, 188, 189, 313, 314; 345/156, 157, 345/158, 162, 183, 179
See application file for complete search history.

(56) References Cited

U.S. PATENT DOCUMENTS

| 4,111,536 | A | * | 9/1978 | Taylor | 352/132 |
| 4,345,239 | A | * | 8/1982 | Elliott | 382/122 |
| 4,972,496 | A | * | 11/1990 | Sklarew | 382/187 |
| 5,012,349 | A | * | 4/1991 | de Fay | 358/296 |
| 5,194,852 | A | * | 3/1993 | More et al. | 345/182 |
| 5,294,792 | A | * | 3/1994 | Lewis et al. | 250/221 |
| 5,528,263 | A | * | 6/1996 | Platzker et al. | 345/156 |
| 5,717,168 | A | * | 2/1998 | DeBuisser et al. | 178/18.04 |
| 5,838,819 | A | * | 11/1998 | Ruedisueli et al. | 382/187 |
| 5,850,058 | A | * | 12/1998 | Tano et al. | 178/18.01 |
| 5,903,667 | A | * | 5/1999 | Kuzunuki et al. | 382/187 |

(Continued)

FOREIGN PATENT DOCUMENTS

DE     195 43 959 A1    5/1997

(Continued)

*Primary Examiner*—Andrew W. Johns
*Assistant Examiner*—Anthony Mackowey
(74) *Attorney, Agent, or Firm*—Bell, Boyd & Lloyd LLP

(57) ABSTRACT

The present invention concerns a device for detecting and representing movements. The device includes a position sensor for detecting the current position of a reference point of the device, a data processor for processing the position data detected by the position sensor and a projector for projecting on a surface an image projection of the detected and processed position data. The data processor takes into account a modification in the current position of the reference point such that the projection image on the surface remains substantially stable concerning location and position.

19 Claims, 6 Drawing Sheets

U.S. PATENT DOCUMENTS

| | | | |
|---|---|---|---|
| 6,079,862 A * | 6/2000 | Kawashima et al. | 382/103 |
| 6,330,976 B1 * | 12/2001 | Dymetman et al. | 235/487 |
| 6,353,428 B1 * | 3/2002 | Maggioni et al. | 345/157 |
| 6,460,766 B1 * | 10/2002 | Olschafskie et al. | 235/454 |
| 6,504,956 B1 * | 1/2003 | Gannage et al. | 382/188 |
| 6,567,076 B2 * | 5/2003 | Yeh | 345/173 |
| 6,655,597 B1 * | 12/2003 | Swartz et al. | 235/462.45 |
| 6,657,618 B2 * | 12/2003 | Moore | 345/179 |
| 6,686,910 B2 * | 2/2004 | O'Donnell, Jr. | 345/179 |
| 6,766,066 B2 * | 7/2004 | Kitazawa | 382/291 |
| 6,970,600 B2 * | 11/2005 | Abe | 382/187 |
| 6,985,643 B1 * | 1/2006 | Fahraeus et al. | 382/313 |
| 7,036,938 B2 * | 5/2006 | Wang et al. | 353/46 |
| 7,069,516 B2 * | 6/2006 | Rekimoto | 715/757 |
| 7,136,053 B2 * | 11/2006 | Hendriks et al. | 345/179 |
| 7,139,445 B2 * | 11/2006 | Pilu et al. | 382/313 |
| 2001/0025289 A1 * | 9/2001 | Jenkins et al. | 708/141 |
| 2001/0030668 A1 * | 10/2001 | Erten et al. | 345/863 |
| 2001/0044858 A1 * | 11/2001 | Rekimoto | 710/1 |
| 2003/0091234 A1 * | 5/2003 | Lapstun et al. | 382/187 |
| 2003/0095708 A1 * | 5/2003 | Pittel | 382/187 |
| 2003/0185444 A1 * | 10/2003 | Honda | 382/186 |
| 2004/0047505 A1 * | 3/2004 | Ghassabian | 382/186 |
| 2004/0114834 A1 * | 6/2004 | Fisher | 382/314 |

FOREIGN PATENT DOCUMENTS

| | | |
|---|---|---|
| EP | 0 693 739 A2 | 1/1996 |
| EP | 0 907 278 A2 | 4/1999 |
| JP | 07013105 A * | 1/1995 |
| JP | 08160539 | 6/1996 |
| WO | WO 00/00928 | 1/2000 |

* cited by examiner

DEVICE FOR DETECTING AND REPRESENTING MOVEMENTS

BACKGROUND OF THE INVENTION

Such a device, configured as a mobile radio terminal, is generally known, for example, from EP 907 278 A3. The device according to this prior art includes a pen-shaped object via which specific movements can be executed on a surface; for example, writing movements. The movements are detected by a movement sensor and then analyzed, so that written characters can be identified with the device and can be further processed by radio transmission, etc. The device according to such prior art, however, has the disadvantage that it is relatively difficult to use, particularly because the user does not have direct sight of the information they have written "virtually" with the pen-shaped device.

A device is also known from the prior art (see, for example, http://www.anoto.com) with the registered name "Anoto," which is supplied with ink much like a conventional pen for use on a paper document. The paper document is printed with a special pattern. The pen also has a camera in the vicinity of its writing tip, which analyzes and records the pen movement with reference to the pattern printed on the paper. Such device has the disadvantage that, on the one hand, it has to be designed so that the large quantities of data generated by the camera can be processed, which requires a large data processing input. On the other hand, such device only functions with the patterned paper associated with it in each instance, which makes its deployment problematic.

It is, in contrast, an object of the present invention to provide a device of the type mentioned above which can be operated in a simple and user-friendly manner and allows reliable movement detection with simultaneous representation of executed movements.

SUMMARY OF THE INVENTION

Such object is achieved by a device for detecting and representing movements, which includes:
   a position sensor for detecting the current position of a reference point of the device,
   a data processor for processing position data detected by the position sensor, and
   a projector for projecting a projected image of the detected and processed position data onto a surface, whereby the data processor takes into account a change in the current position of the reference point such that the projected image on the surface remains substantially stable with regard to location and position.

The device is configured so that it uses the position sensor means to detect the current position of the reference point of the device and the changes in this position, and uses the data processor to process the detected position data without recourse to additional aids, such as patterned paper. Position data can, for example, be detected such that the device is moved on a substantially planar surface, whereby the plane is spanned by two axes of a coordinate system, such as the x-axis and the y-axis, and whereby the third axis is substantially orthogonal with respect to the plane. Movement can be detected by detecting the changes in the respective x, y and z coordinates. The position data detected during the movement of the device is then projected onto the surface after processing via the projector as a visible projected image, so that the user has the impression, due to the projection of the detected and processed position data on the surface, that they have deposited ink, for example, on the surface while executing the movements. In fact, however, it is "virtual writing," as the projected image is also removed when the device is removed from the surface.

One aspect of the present invention is that the current movement of the device is compensated for during projection of the detected and processed position data on the surface, so that the projected image on the surface remains substantially stable with regard to location and position. It should be noted that although the projector moves with the device during movement on the surface, such movement of the projector is eliminated by the data processor for projection of the projection data onto the surface via the compensation mentioned above. It is thereby possible for a user of the device according to the present invention to execute writing movements on a surface, whereby the writing movements are detected in realtime and represented by projection on the surface so that the user has the impression of actually writing or drawing on the surface. An important advantage of the present invention is that no additional aids, such as additional paper, for example, are required for its use and that the movements made are visibly represented to the user by the projected image.

In one embodiment of the present invention, the device is in the form of a pen. This allows the present invention to be moved over the surface in a very convenient and simple manner.

The reference point can also be formed by a pen tip; in particular, a pressure-stabilized pen tip. Such an embodiment allows intuitively simple use of the device as a user can use the device like a conventional pen, whereby the significant movements are executed with the pen tip. Pressure stabilization can lengthen the life of the device according to the present invention. For example, the pen tip can be made of an easy-glide material with a low wear rate.

In order to ensure sufficiently good position sensing with the device according to the present invention configured as a pen with pen tip, in one embodiment, the position sensor and/or the projector can be located at a point on the device in proximity to the pen tip.

The position sensor can be designed with at least one optical sensor and/or with at least one mechanical sensor and/or with at least one acceleration sensor and/or with a combination of such sensors. It should be ensured that the at least one sensor or the combination of sensors is configured so that at least movements on the surface (i.e., in the XY plane), but preferably also movements that are orthogonal with respect to the surface (i.e., along the z-axis), are detected. In one embodiment of the present invention, it also is possible to detect rotational movement about an axis that is orthogonal with respect to the surface; i.e., about an axis parallel to the z-axis.

The at least one optical sensor also can be configured as an optical movement sensor for detecting a translatory movement of the reference point.

The at least one optical sensor also can be configured to detect a rotary movement about an axis extending through the reference point. Using an optical sensor has the advantage that it operates in a contactless manner and its mode of operation is, therefore, not impaired by dirt or mechanical erosion or damage. Also, optical sensors have a low rate of power consumption so that if the device is configured to operate independently with a battery, the standby time of the battery is not significantly reduced by the at least one optical sensor.

When a mechanical sensor is used, the position sensor also can be configured as a roll sensor for detecting a rolling movement on the surface. Roll sensors are available at low cost and with sophisticated technology. It should be noted, however, that when a roll sensor is used, there always has to be mechanical contact with a sufficiently high level of contact pressure between the device according to the present invention and the surface, so that the roll sensor can reliably detect the executed movements.

If an acceleration sensor is used in the context of the position sensor, in one embodiment of the present invention this can be configured as a rotation angle type acceleration sensor or as a longitudinal type acceleration sensor to detect acceleration of the reference point of the device.

It is also possible, as mentioned above, to use different hybrid combinations of the sensor types mentioned above; for example, a combination of a rolling or optical sensor without rotation detection about the Z-axis or an axis parallel to this and a rotation angle type acceleration sensor for additional detection of rotation about the z-axis.

A particularly simple embodiment of the data processor results, for example, when the data processor includes a microprocessor, in which all the stages required for data processing can be implemented. If required, the microprocessor can be configurable so that the device according to the present invention can be customized to the user's specific needs.

The projector can be configured with at least one laser projector. In a simpler embodiment of the device according to the present invention the laser projector can be configured as a monochrome laser projector. In a more user-friendly embodiment, the laser projector also may generate multi-colored projected images. There are various options with regard to the arrangement of the laser projector, unlike the movement detector, which has to be arranged in the closest proximity possible to the reference point of the device according to the present invention. For example, if the laser projector is in miniaturized form, it is also possible to locate this in proximity to the reference point, in the exemplary embodiment mentioned above in proximity to the pen tip. This has the advantage that projection can be effected in immediate proximity to the surface onto which the image is to be projected, avoiding lengthy optical paths. This allows areas of shadow to be largely suppressed within the projected image. However, it should be pointed out here that the laser projector should be located so that the areas of shadow produced by the shadow cast by the pen tip are, where possible, not located in the area in which current position data of a movement just executed by the device according to the present invention is represented. Instead, areas of shadow cast by the tip should precede any movement of the device according to the present invention within the projection area generated by the laser projector. It also should be noted that the laser projector should be located in such a way on the device according to the present invention that the projector itself covers parts of the visible projection area, particularly the projected image, to the smallest possible degree.

Should it be desired that the laser projector not be arranged in proximity to the reference point, particularly the pen tip, for example because the laser projector is not to be a miniaturized laser projector or because any restriction of the view of the projection area (shadowed view) should be avoided, it is possible to assign an optical transmission system, particularly a lens arrangement and/or light guide and/or mirror arrangements, etc., to the laser projection to project the projected image onto the surface. The optical transmission system can be used to transmit the optical paths necessary for projection from the laser projector to the surface serving as the projection screen. Such an embodiment, for example, may prove more economical if a more cost-intensive miniaturized laser projector is not used.

In one embodiment of the present invention, the projector can be configured with a number of laser projectors. In this respect, it is possible within the context of the present invention for the laser projectors to be arranged and to interact in such a way that the projected image is made up of partial projected images generated by individual projectors. This allows a larger projected image to be generated, as with a number of laser projectors, the projection area that can be covered by the projectors on the surface increases. The data processor then has to control each laser projector separately and supply them with movement data so that partial projected images result from the individual partial projection areas, which combine to show a substantially artifact-free projected image.

In another embodiment of the present invention, the projector can project the projected image onto the surface within a projection area, whereby the projection area moves on the surface to correspond to the change in the current position of the reference point and whereby the data processor moves the projected image within the projection area with a complementary movement counter to the change in the current position of the reference point to achieve stability of the projected image on the surface with regard to location and position. This embodiment is more specifically based on the characteristic of the device according to the present invention as generally mentioned above, in that the projection area moves with the device according to the present invention on the surface due to the movement of the at least one laser projector. In order now to prevent the projected image of the detected and processed position data moving as well, the projected image moves in a complementary manner, thereby compensating for the movement of the device within the projected image.

In another embodiment of the present invention, the data processor can be configured with a character recognition device, which examines the change in the current position of the reference point as detected by the position sensor for a correspondence with predefined characters and assigns this at least one character, if there is a substantial correspondence. It is thereby possible for the device according to the present invention to recognize characters written with this, particularly with the reference point, and to process them further. For example, a text can be written with the device according to the present invention. This can be recognized character by character and further processed; for example, stored or interpreted as a command in an operating menu.

In another embodiment of the present invention, the device can be configured for cabled or cable-free communication with a remote base. The stored and detected position data, in particular the detected characters, then can be transmitted to the base, so that the text recorded with the device as mentioned above can be transmitted to the base (for example, a computer, etc.), and can be further processed there in the context of an editor. It is also possible to compose messages, such as SMS (Short Message Service) messages, and send these to the base using the device according to the present invention.

In a further embodiment of the present invention, the device can have radio transmission capabilities; in particular, for transmitting the detected movement and/or the identified characters. Such radio transmission can, for example, be based on the GSM (Global System for Mobile Communication System) standard, the UMTS (Universal Mobile Telecommunication System) standard or a different mobile radio standard. It is also possible for such radio transmission to be based on the DECT (Digital European Cordless Telecommunications) standard or the Bluetooth standard or on an IrDA interface.

Additional features and advantages of the present invention are described in, and will be apparent from, the following Detailed Description of the Invention and the figures.

DETAILED DESCRIPTION OF THE INVENTION

Figure 1:
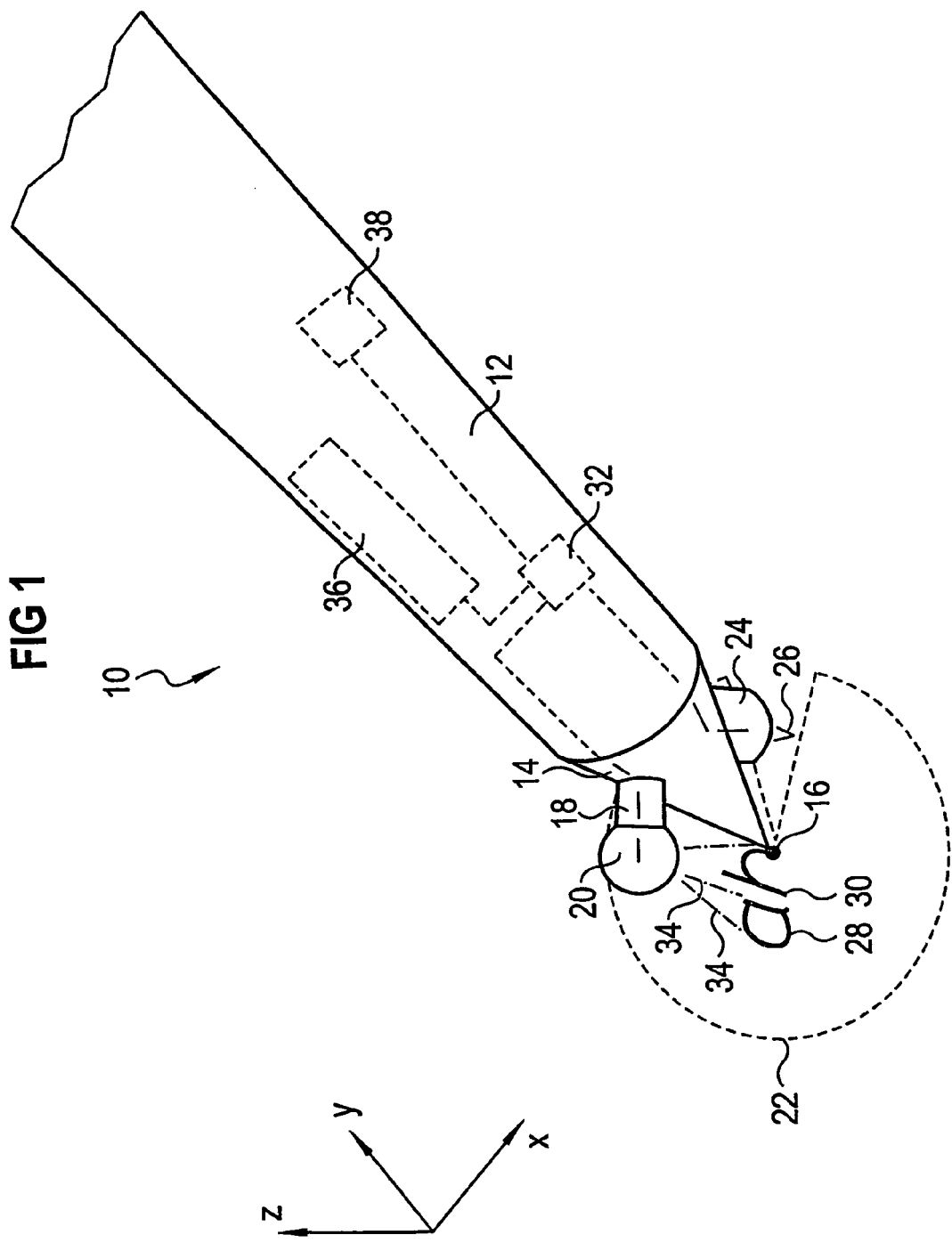
FIG. 1 shows a perspective view of a first exemplary embodiment of the device according to the present invention.
Figure 2:
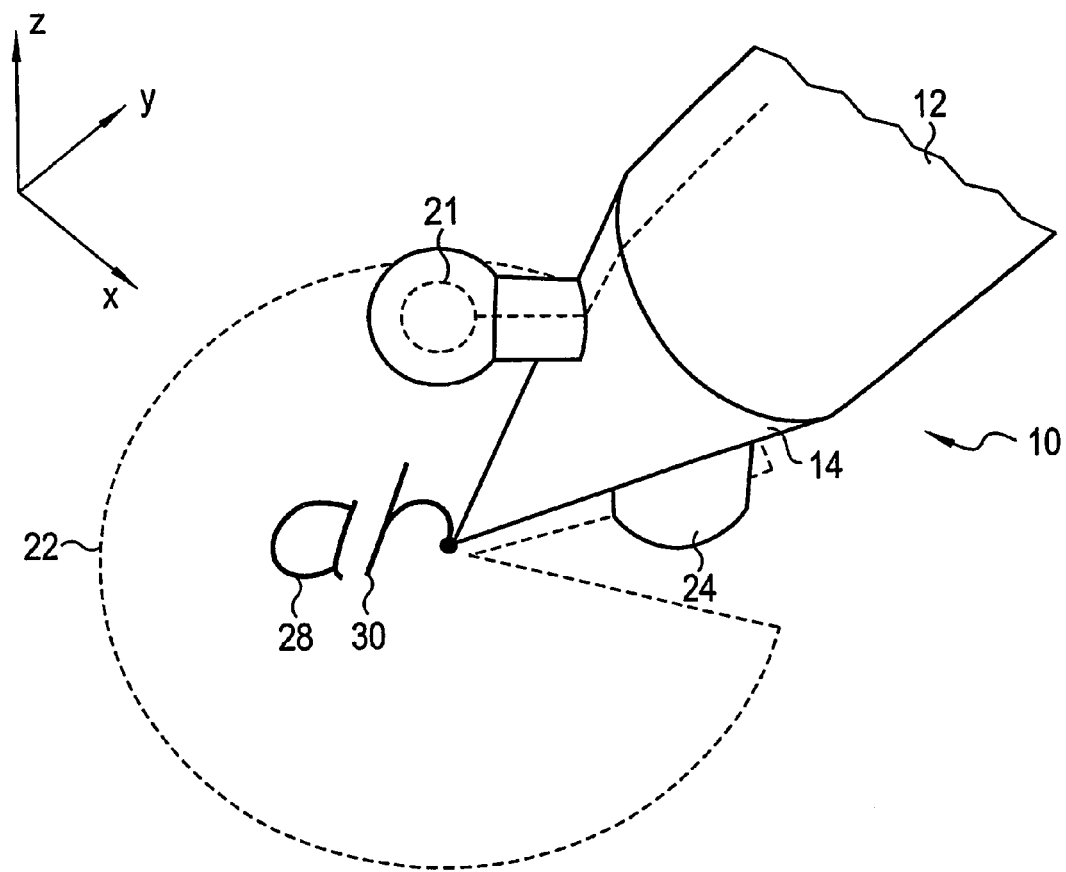
FIG. 2 shows an enlarged view of the lower area of the device according to FIG. 1.
Figure 3:
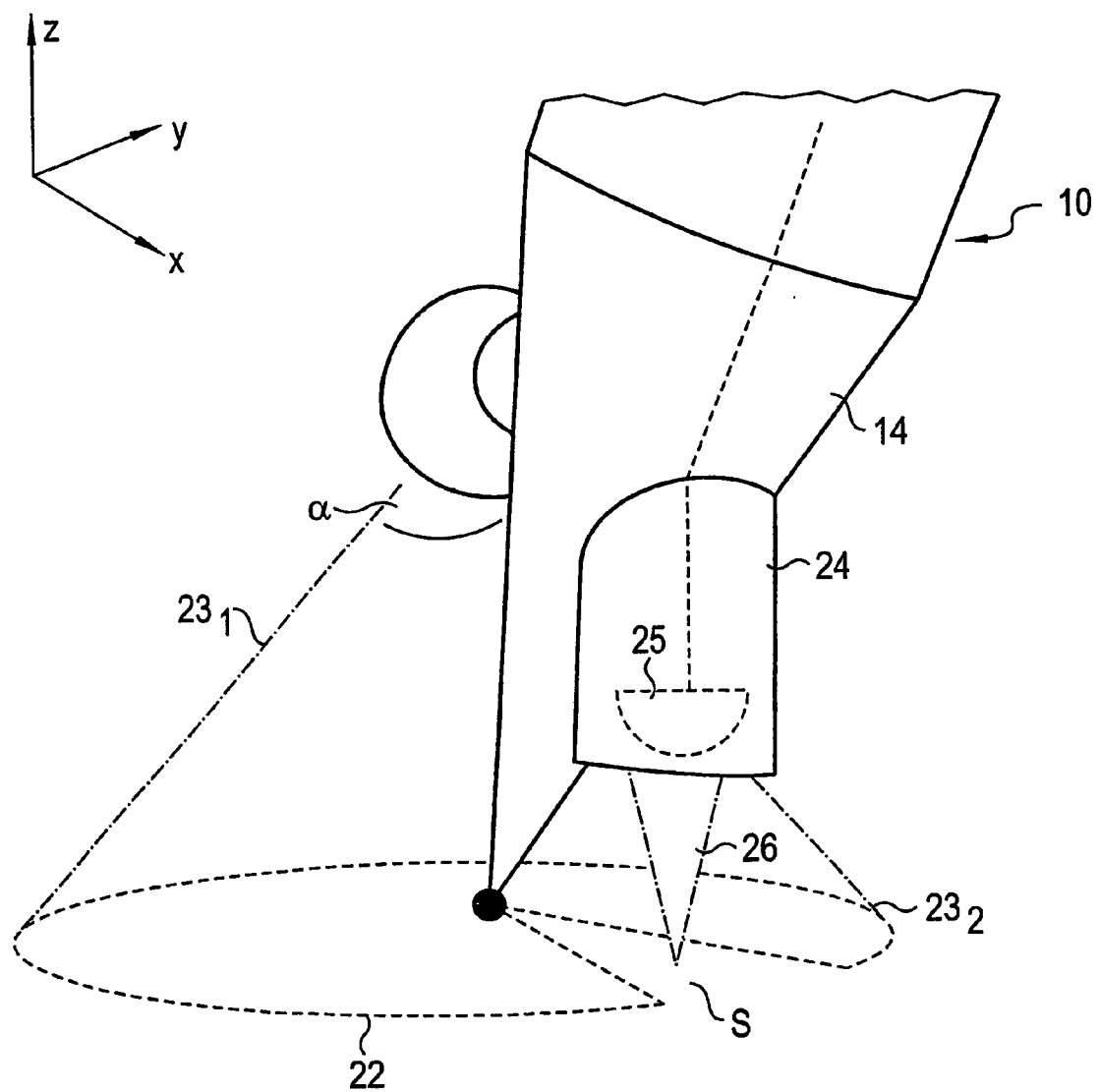
FIG. 3 shows the view according to FIG. 2 from a different perspective.

FIGS. 1, 2 and 3 show a first exemplary embodiment of the device according to the present invention, whereby the device is generally marked as 10. The device 10 is configured as a pen and includes a substantially cylindrical stem 12 and a conical tip 14. The conical tip 14 has a wear-resistant spherical body 16 (made of metal, etc., for example), at its bottommost point in FIGS. 1 to 3. The wear-resistant spherical body 16 has a small diameter, for example 1 mm, and is secured to the conical tip 14.

A first extension 18 is arranged on the conical tip 14, with a spherical body 20 attached to its end furthest away from the tip. A beamer configured as a laser projector 21 is arranged in the spherical body 20 and can project to cover a projection field bounded by a broken edge 22 on a surface defined by the x-axis and the y-axis, the size of the projection field being determined by the aperture a of the projector. A second extension 24 is also arranged on the tip 14 of the device 10 on the side opposite the point of attachment of the extension 18 and is oriented in a substantially orthogonal manner with respect to the surface defined by the x-axis and y-axis when the device is positioned obliquely in the space as shown in FIG. 1. An optical movement sensor 25 is held in the extension 24 and detects movements of the device 10; in particular, the spherical body 16, on the surface defined by the x-axis and y-axis using optical measurements taken by the optical path 26.

The device functions in such a way that the stem 12 with its tip 14 and the spherical body 16 is moved like a conventional pen on the plane defined by the x-axis and y-axis, to write single letters 28, 30, as shown in FIG. 1. This movement of the spherical body 20 on the surface defined by the x-axis and y-axis is detected by the movement sensor 25 held in the extension 24 via the optical path 26 in a manner that is conventional for an optical sensor, such as by detecting a movement-dependent change in the surface structure, and transmitted to a data processing unit 32. This processes the detected position data, subjects this to different procedures (for example, a character recognition processing procedure) and, as shown in the example in FIG. 1, arrives at the result that the letters "a" and "h" were drawn on the surface defined by the x-axis and y-axis with the pen-shaped device 10.

The data processing unit 32 then emits corresponding signals to the projector 21 located in the spherical body 20. As shown, for example, by the beams 34, this projects the letters detected by the data processing unit 32 within the projection area 22 onto the surface defined by the x-axis and y-axis, so that the user has the impression that they have written the characters 28 and 30 with the spherical body 20 on the surface defined by the x-axis and y-axis. With every movement of the device 10, which is detected by the position sensor 25 held in the extension 24, the data calculated by the data processing unit 32 is supplied to the projector 21 housed in the spherical body 20 so that despite the movement of the device 10, the characters 28 and 30 and where appropriate other written characters remain stable with regard to position and location on the surface defined by the x-axis and y-axis. In other words, the displacement during a writing movement of the pen-shaped device 10 within the XY plane from left to right as shown in FIG. 1 is taken account during projection so that despite the corresponding movement of the projector 21 housed in the spherical body 20 and, therefore, the corresponding movement of the projection field 22, the characters remain stable with regard to location and position on the surface defined by the x-axis and y-axis, so that the characters 28 and 30 within the projection field 22 move from right to left counter to the movement of the device 10 from left to right.

It can be seen from FIG. 3 that the projector 21 only can project with a very specific angle α of the outermost beams $23_1$ and $23_2$, which define the projection field bounded by the edge 22. It also can be seen clearly from FIG. 3 that the tip 14 casts a conical shadow into the projection area and this shadow is out of the range of the projector 21.

It also should be noted that the device 10 is supplied with energy by a battery 36 and has a radio module 38 connected to the data processing unit for radio communication; in particular, radio transmission of the detected position data or identified characters with a base station.

Figure 4:
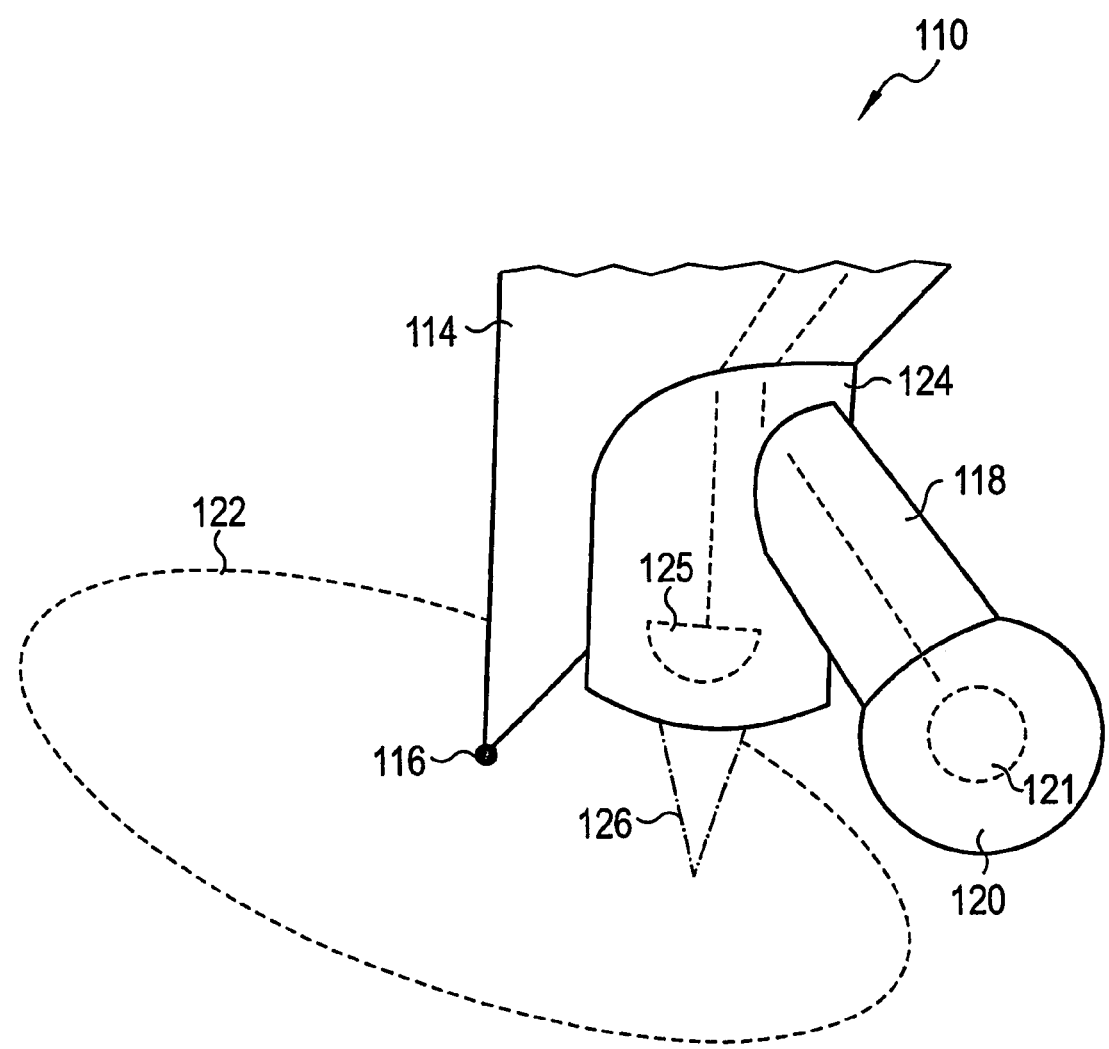
FIG. 4 shows a perspective view of a second exemplary embodiment of the device according to the present invention.

FIG. 4 shows a second exemplary embodiment of the present invention. The same reference characters as above in the description of the first exemplary embodiment with reference to FIGS. 1 to 3 are again used.

To avoid repetitions, only the essential differences compared with the first exemplary embodiment are described. The section of the device 110 according to the present invention shown in FIG. 4 only shows part of the tip 114 which, as already explained with reference to FIG. 1, holds the extension 124. As with the first exemplary embodiment according to FIGS. 1 to 3, the position sensor 125 is held in this extension. The beams 126 are emitted from this position sensor 125 for the purposes of position sensing. Unlike the first exemplary embodiment described with reference to FIGS. 1 to 3, the extension 118 is not located directly on the tip 114 at a point opposite in the extension 124 but is located directly on the extension 124 itself. As such, the extension 118 and the spherical body 120 holding the projector 121 and located at its free end, does not block the view of the characters written in the projection field 122. Rather both the extension 124 and the extension 118 with its spherical body 120 are located in an area which, when the device 110 according to the present invention is in an oblique position, is blocked by the tip 114 and the stem (not shown) so that a user has the same view of the surface to be written on, only slightly restricted by the pen dimensions, as is the case with a conventional pen tip.

The mode of operation of the device according to the present invention according to the second exemplary embodiment, as shown in FIG. 4, substantially corresponds to the mode of operation according to the first exemplary embodiment. It should be noted, however, that different shadow conditions result compared with the first exemplary embodiment due to the way in which the extension 118 is located with the spherical body 120 holding the projector 121. With the embodiment shown in FIG. 4, less shadow can be expected to be cast within the projection field 122 by the tip 114 compared with the first exemplary embodiment according to FIGS. 1 to 3.

Figure 5:
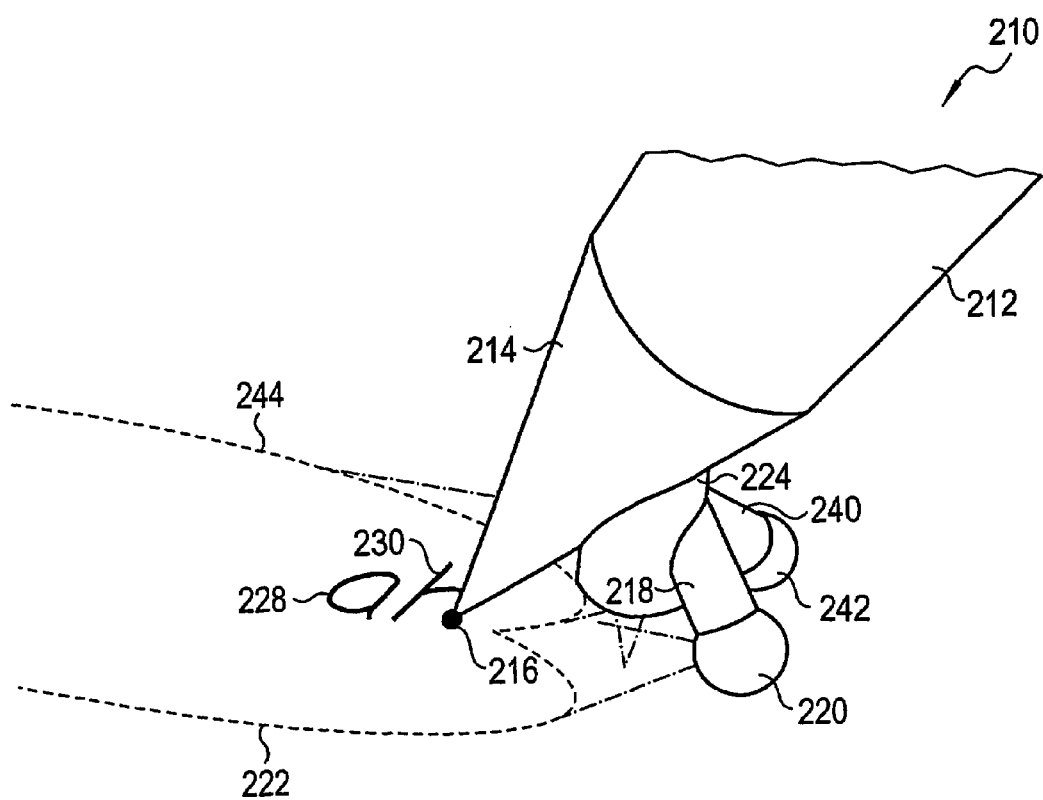
FIG. 5 shows a perspective view of a third exemplary embodiment of the device according to the present invention.

FIG. 5 shows a third exemplary embodiment of the present invention, which is based on the exemplary embodiment as shown in FIG. 4. The same reference characters as for the description of the exemplary embodiments according to FIGS. 1 to 4 are again used.

The difference with respect to the exemplary embodiment according to FIG. 4 is that a further extension 240 with a further spherical body 242 is arranged on the extension 224, which extends out and downwards from the tip 214, in addition to the extension 118 with its spherical body 220, whereby a further projector is held in the spherical body 242. The two extensions 220 and 240 are located on the extension 224 in such a way that their longitudinal axes form an acute angle with each other. As such, the two projectors (not shown) assigned to the spherical bodies 220 and 242 generate two projection fields, the edges of which are shown partially in FIG. 5 by the two lines 222 and 244. These two projection areas form partial areas of an overall projection area, which can be used to represent the projected image; in particular, to represent the characters 228 and 230. The two partial projection areas overlap to some degree. The advantage of the exemplary embodiment shown in FIG. 5 is that the overall projection area formed by the partial projection areas is bigger than is possible with a single projector and that a larger projected image and ultimately a larger number of characters can be represented.

Figure 6:
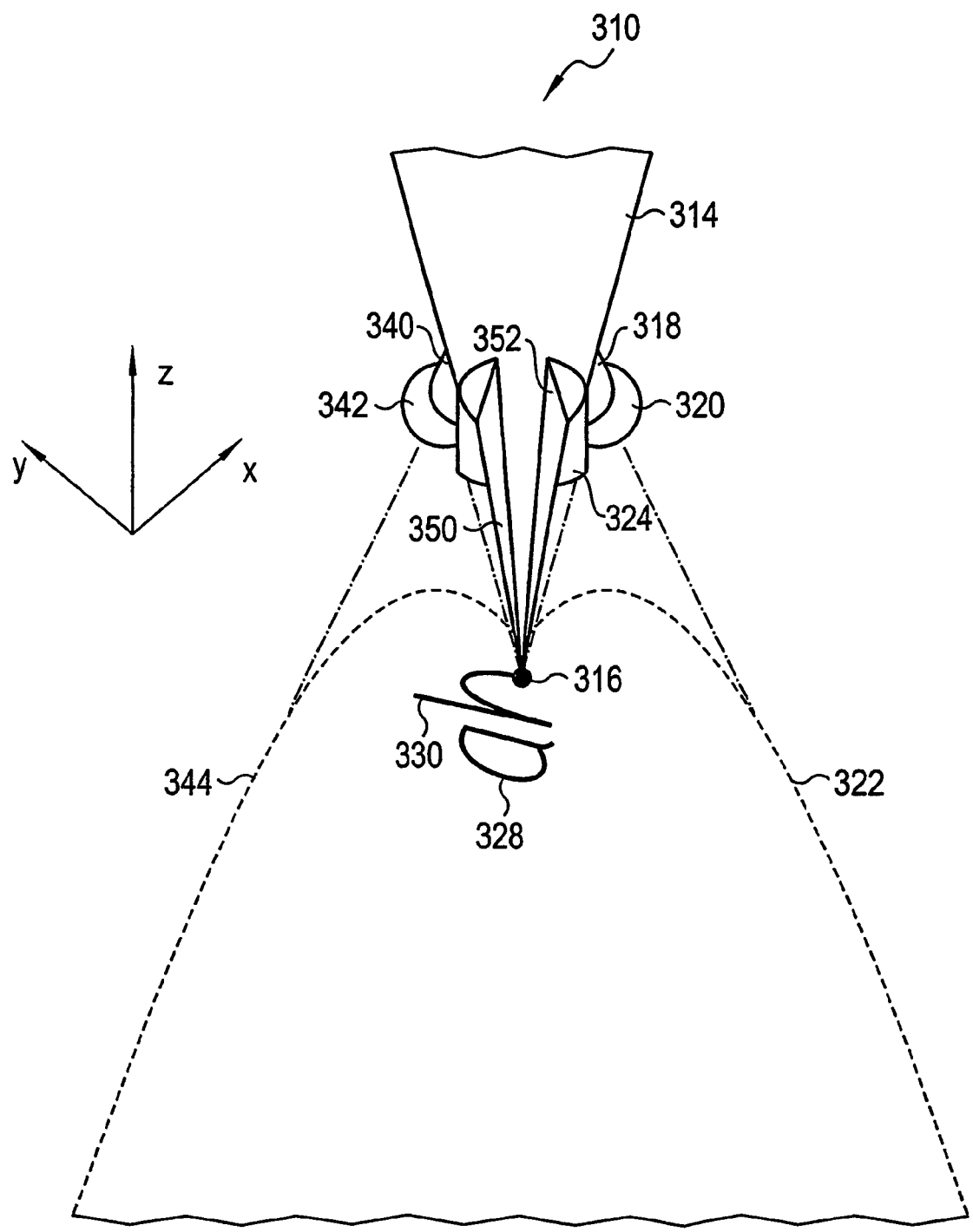
FIG. 6 shows a perspective view of a fourth exemplary embodiment of the device according to the present invention.

FIG. 6 shows a fourth exemplary embodiment of the present invention, which is based on the third exemplary embodiment according to FIG. 5. The same reference characters as in the previous description are again used.

The representation according to FIG. 6 corresponds to a perspective view in the direction of writing. Again, only the tip 314 of the device 310 according to the present invention is shown. With the fourth embodiment shown in FIG. 6, the difference compared with the third embodiment shown in FIG. 5 is that the volume of the lower part of the tip 314 is reduced by recesses 350 and 352 so that the shadow cast by the tip within the overall projection field, defined by the lines 322 and 344, is smaller.

The mode of operation of the exemplary embodiment according to FIG. 6 corresponds to that of the exemplary embodiment according to FIG. 5; i.e., two partial projection areas are generated with two projectors held in the spherical bodies 320 and 342 to give an overall projection area.

Although the present invention has been described with reference to specific embodiments, those of skill in the art will recognize that changes may be made thereto without departing from the spirit and scope of the present invention as set forth in the hereafter appended claims.

The invention claimed is:

1. A device for detecting and representing movements, comprising:
    a position sensor for detecting a current position of a reference point of the device;
    a data processor for processing position data detected with the position sensor; and
    a projector for projecting a projected image of the detected and processed position data onto a surface, wherein the projector moves with the reference point and the data processor takes into account a change in the current position of the reference point such that the projected image on the surface remains substantially stable with regard to location and position.

2. A device for detecting and representing movements as claimed in claim 1, wherein the device is configured in pen form.

3. A device for detecting and representing movements as claimed in claim 2, wherein the reference point is formed by a pressure-stabilized pen tip.

4. A device for detecting and representing movements as claimed in claim 3, wherein at least one of the position sensor and the projector is arranged at a point on the device proximate to the pen tip.

5. A device for detecting and representing movements as claimed in claim 1, wherein the position sensor includes at least one of at least one optical sensor, at least one mechanical sensor and at least one acceleration sensor.

6. A device for detecting and representing movements as claimed in claim 5, wherein the at least one optical sensor is an optical movement sensor for detecting a translatory movement of the reference point.

7. A device for detecting and representing movements as claimed in claim 5, wherein the at least one optical sensor is a rotary movement sensor for detecting a rotary movement about an axis extending through the reference point.

8. A device for detecting and representing movements as claimed in claim 5, wherein the at least one mechanical sensor is a roll sensor for detecting a rolling movement on the surface.

9. A device for detecting and representing movements as claimed in claim 5, wherein the at least one acceleration sensor is one of a rotation angle-type acceleration sensor and a longitudinal-type acceleration sensor for detecting acceleration of the reference point of the device.

10. A device for detecting and representing movements as claimed in claim 1, wherein the data processor includes a microprocessor.

11. A device for detecting and representing movements as claimed in claim 1, wherein the projector includes at least one laser projector.

12. A device for detecting and representing movements as claimed in claim 11, wherein the at least one laser projector is arranged at a point proximate to the reference point, with the reference point being formed by a pressure-stabilized pen tip.

13. A device for detecting and representing movements as claimed in claim 11, wherein the laser projector is arranged at a point remote from the reference point, with the reference point being formed by a pressure-stabilized pen tip, and wherein an optical transmission system is assigned to the laser projector to project the projected image onto the surface.

14. A device for detecting and representing movements as claimed in claim 11, wherein the projector includes a plurality of laser projectors.

15. A device for detecting and representing movements as claimed in claim 14, wherein the plurality of laser projectors are arranged and interact in such a way that the projected image is made up of partial projected images respectively generated by individual projectors.

16. A device for detecting and representing movements as claimed in claim 1, wherein the projector projects the projected image within a projection area onto the surface, wherein the projection area on the surface moves to correspond to a change in the current position of the reference point, and wherein the data processor moves the projected image within the projection area with a complementary movement counter to the change in the current position of the reference point to achieve stability of the projected image with respect to location and position.

17. A device for detecting and representing movements as claimed in claim 1, wherein the data processor includes a character recognition device for examining a change in the current position of the reference point detected by the position sensor for correspondence with predefined characters and for assigning a character if there is substantial correspondence.

18. A device for detecting and representing movements as claimed in claim 17, wherein the device is configured for communication with a remotely located base, the communication being one of cabled and cable-free.

19. A device for detecting and representing movements as claimed in claim 18, further comprising radio transmission parts for transmitting at least one of detected movement and identified characters.

* * * * *